US006724428B1

United States Patent
Goh (10) Patent No.: US 6,724,428 B1
(45) Date of Patent: Apr. 20, 2004

(54) SHUTTER AND LENS APPARATUS OF A DIGITAL CAMERA WITH A STEPLESS FOCUSING FUNCTION

(75) Inventor: Nai-Sim Goh, Taipei (TW)

(73) Assignee: NuCam Corporation, Taipei (TW)

( * ) Notice: Subject to any disclaimer, the term of this patent is extended or adjusted under 35 U.S.C. 154(b) by 0 days.

(21) Appl. No.: 09/387,545

(22) Filed: Aug. 31, 1999

(51) Int. Cl.[7] .................. H04N 5/225; G02B 15/14; G03B 7/24; G03B 9/08; G03B 9/04
(52) U.S. Cl. .................. 348/373; 359/698; 396/208; 396/449; 396/459; 396/467
(58) Field of Search .................. 348/373; 359/698, 359/699, 700; 396/208, 450, 451, 449, 485, 483, 505, 467, 459, 508

(56) References Cited

U.S. PATENT DOCUMENTS

| 4,279,485 A | * | 7/1981 | Grunbacher | 396/251 |
| 5,270,868 A | * | 12/1993 | Nomura | 359/700 |
| 5,337,110 A | * | 8/1994 | Dowe | 396/449 |
| 5,488,513 A | * | 1/1996 | Tanaka | 359/699 |
| 5,739,962 A | * | 4/1998 | Asakura et al. | 359/700 |
| 5,970,262 A | * | 10/1999 | Tseng et al. | 396/144 |
| 6,027,261 A | * | 2/2000 | Naganuma | 396/508 |
| 6,086,267 A | * | 7/2000 | Tsuzuki et al. | 396/459 |
| 6,099,172 A | * | 8/2000 | Togashi | 396/502 |
| 6,101,333 A | * | 8/2000 | Bullitt et al. | 396/61 |
| 6,118,947 A | * | 9/2000 | Suh | 396/90 |
| 6,161,966 A | * | 12/2000 | Chang et al. | 396/508 |

* cited by examiner

Primary Examiner—Wendy R. Garber
Assistant Examiner—James M. Hannett
(74) Attorney, Agent, or Firm—Baker Botts LLP (57) ABSTRACT

This invention discloses a shutter and lens apparatus including a lens housing for receiving a multi-function support. The multi-function support includes a lens seat fitting with a lens and two solenoid valves attached on its bottom. A shutter slice and a diaphragm are mounted on the top surface of multi-function support, and pivot around a shaft projected thereon. Two movable rods of the solenoid valves are coupled with the shutter slice and diaphragm to drive them passing a light path, an axis through the lens, for controlling time and quantities of light projected through the lens. A housing cover encases the lens, the multi-function support, and a spring into the lens housing.

15 Claims, 8 Drawing Sheets

SHUTTER AND LENS APPARATUS OF A DIGITAL CAMERA WITH A STEPLESS FOCUSING FUNCTION

FIELD OF THE INVENTION

The present invention relates a digital camera, and more specifically to a shutter and lens apparatus with a stepless focusing function.

BACKGROUND OF THE INVENTION

A digital camera, one of the important peripherals of multi-media computers with advantages of without using films and developing pictures, has become more and more popular nowadays. Unlike the pictures taken by traditional cameras, the images captured by digital cameras are easy to edit and convenient to process associated with other devices, such as personal computer, printer, and so on. Therefore, digital cameras are widely used in various fields, such as web site designs and data preservation.

In spite of the advantages of digital cameras mentioned above, the image qualities of digital cameras are still need to be improved. For most digital camera, CCD and CMOS sensor chips are frequently used to fabricate digital cameras. Although the CCD sensor chip provides better image qualities, it's also more expensive than the CMOS sensor chip. Therefore, the CCD sensor chip is often used in mega-pixel level digital cameras, and the COMS sensor chip is widely used in introductory machines, such as 300,000-pixel level digital cameras and 800,000-pixel level digital cameras. Actually, the image qualities produced by introductory digital cameras are far behind the qualities of pictures taken by traditional cameras, and the digital cameras of 2 million pixels could only provide images identical to traditional pictures.

When the number of pixel of digital camera exceeds one million, besides the issue of raising memories, the light leakage, a phenomenon that undesired light leaking from shutter device onto the sensor chip, becomes an important issue to fabricate the digital camera. For example, while photo charges generated by a CCD sensor chip are transferring from a vertical charge couple device (VCCD) to a horizontal charge couple device (HCCD), the light leakage would cause noises to damage output images. Currently, mechanical shutter apparatuses are used to prevent the light leakage, however they are not fast enough to suppress the light leakage of mega-pixel level digital camera. Thus, a novel shutter apparatus is needed to prevent the light from leaking onto the sensor chip.

SUMMARY OF THE INVENTION

An object of the invention is to provide a shutter and lens apparatus of digital camera.

Another object of the invention is to suppress the light leakage of digital camera.

Yet another object of the invention is to use solenoid valves to prevent undesired light from leaking into a lens of digital camera.

The shutter and lens apparatus of the invention includes a lens housing with a cavity for receiving a multi-function support. The multi-function support has a lens seat atop, and two solenoid valves attached on its bottom. A lens is partially placed in the lens seat, and partially extruding from a top surface of the multi-function support. A shutter slice with a shutter aperture is pivoted on a shaft of the top surface of multi-function support, and placed in a slot of the lens. Initially, the shutter aperture coincides with the axis of the lens for allowing light to pass through the lens and project on a sensor chip. When the shutter button is pushed, the shutter slice is driven to swing across the slot by a rod attached on one of the solenoid valves, so as to prevent an undesired amount of light from leaking onto the sensor chip. Since the solenoid valve has a high operating frequency, the instant of the shutter slice pass across the slot would be short enough to suppress the light leakage. A diaphragm with two apertures in different radii is pivoted on the shaft the shutter slice mounted on. Similarly, the diaphragm is driven by the solenoid valve to swing in the slot of lens so as to allow an amount of light passing through the lens via the apertures. Since the apertures are in different radii, the amount of the light passing through the lens could be alternated by switching the apertures. The diaphragm and the shutter slice are separately coupled with two rods of solenoid valves thereby being driven simultaneously with the operating frequency of them. In addition, a split sticking through the lens is set between the shutter slice and diaphragm for avoiding interference while the shutter slice and the diaphragm moving.

Three extrusions around the lens seat are projected from a bottom surface of the multi-function support. The three extrusions respectively rest on and move along three inclines, which have the same slopes and altitudes, of a focus adjustment thereby changing altitudes of the lens fitted in the lens seat of multi-function support.

The focus adjustment is constructed with a focus adjusting gear and a lens tube with three inclines atop being set in the center of the focus adjusting gear. The lens tube fits with the lens seat so as to keep the inclines in touch with the extrusions. When the focus adjusting gear turns, the extrusions relatively move along the inclines thereby changing altitudes of the lens. A first decelerating gear and a second decelerating gear are connected between the focus adjusting gear and driving means, such as a stepping motor. Therefore, the driving means could adjust the focus of the lens via the combination of gears. In addition, a micro adjustment including several gears is connected with the focus adjustment for predetermining altitudes of the lens by adjusting the gears, and the gear would be fixed after the predetermination.

The present shutter and lens apparatus further includes a sensor chip base providing a plurality of pillars to connect to the first decelerating gear, second decelerating gear, and micro adjustment. A sensor chip is mounted on the sensor chip base for receiving the light projected through the lens and transforming it into electric output signals. Finally, a housing cover encases the lens, the multi-function support, and a spring atop the multi-function support into the lens housing, in which the spring stressed between the housing cover and the multi-function support provides a force keeping the extrusions in touch with the inclines.

DETAILED DESCRIPTION OF THE PREFERRED EMBODIMENTS

As described above, a sensor chip of digital camera, such as CCD, CMOS, generates photo charges while it absorbs the light reflected from objects through a lens of digital camera, and the photo charges are then transferred via VCCD, HCCD and finally being preserved in storage media as a completed image of the objects. Although control electrodes of digital camera, i.e. shutter slice and diaphragm, are made of opaque materials, the light leakage still happens because the operating frequency of the control electrodes is not fast enough to match the period of transferring the photo charges via VCCD, HCCD, and to storage media. The light leakage would induce noises, which are proportional to the period of transferring photo charges, thereby damaging the images captured by digital cameras. Since the transferring period of digital camera of or under 800,000 pixels is relatively short enough to the operating frequency of traditional shutter apparatus, the light leakage is not a serious issue to the digital camera. However the sensor chip of the digital camera of or over one million pixels has a great number of photodiodes, thus causing sensitivity of each photodiode getting dull, it means that transferring photo charges takes more time than the period of the digital camera of or under 800,000 pixels. Therefore, the light leakage would be a serious issue to the digital camera over one million pixels.

For suppressing the light leakage, the present invention discloses a shutter and lens apparatus with solenoid valves to speed up the operating frequency of shutter slice and diaphragm so as to completely and accurately prevent undesired light from projecting onto the sensor chip. For illustrating the present invention clearly, an embodiment is described as follows associated with drawings.

Figure 1:
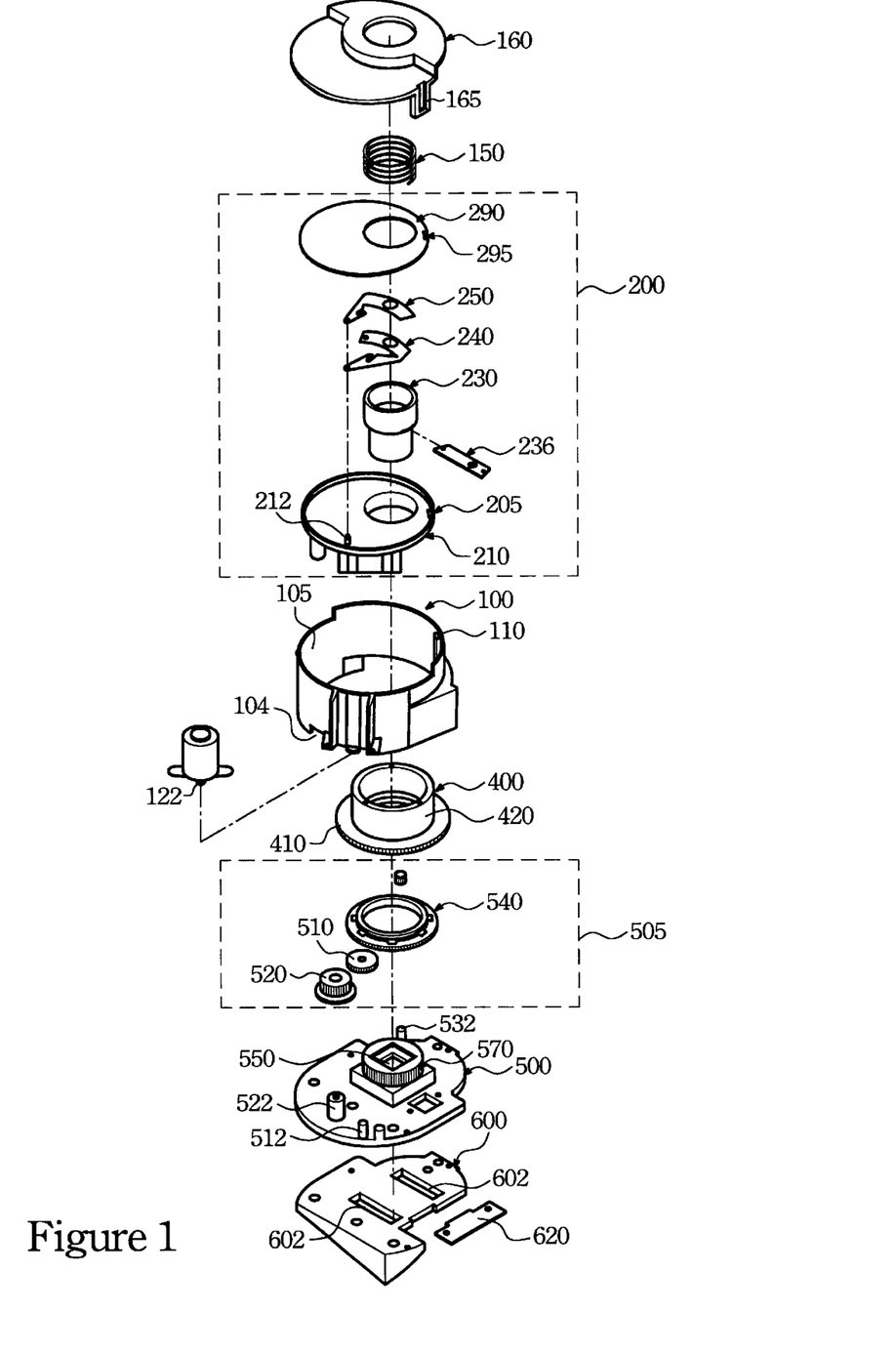
FIG. 1 shows an exploded diagram of components of the present shutter and lens apparatus.

Referring to FIG. 1, the present shutter and lens apparatus includes a lens housing 100 with cavity 105, and a shutter and lens assembly 200. The shutter and lens assembly 200 is encased in the cavity 105 of lens housing 100 by fitting a key way 205 of multi-function support 210 and key way 295 of support cover 290 with a long key 110 of lens housing 100. A spring 150 is mounted upon the support cover 290 and fixed between it and a housing cover 160 by buckling the housing cover 160 to the lens housing 100. The spring 150 provides a force to push the multi-function support 210 contacting with a focus adjustment 400, while it moves upwardly and downwardly respect to the focus adjustment during focusing procedures of lens 230, which is mounted on a top surface of the support. The shutter and lens assembly 200 includes a diaphragm 240 and shutter slice 250 for controlling quantities of the light passing through the lens 230. In addition, focuses of lens 230 are adjusted through driving the focus adjustment 400 via a gear assembly 505 to raise or descend altitudes of lens 230. Finally, a sensor chip base 500 with pillars connecting with the gear assembly is attached on the bottom of the lens housing 100 forming the present shutter and lens apparatus.

Figure 2:
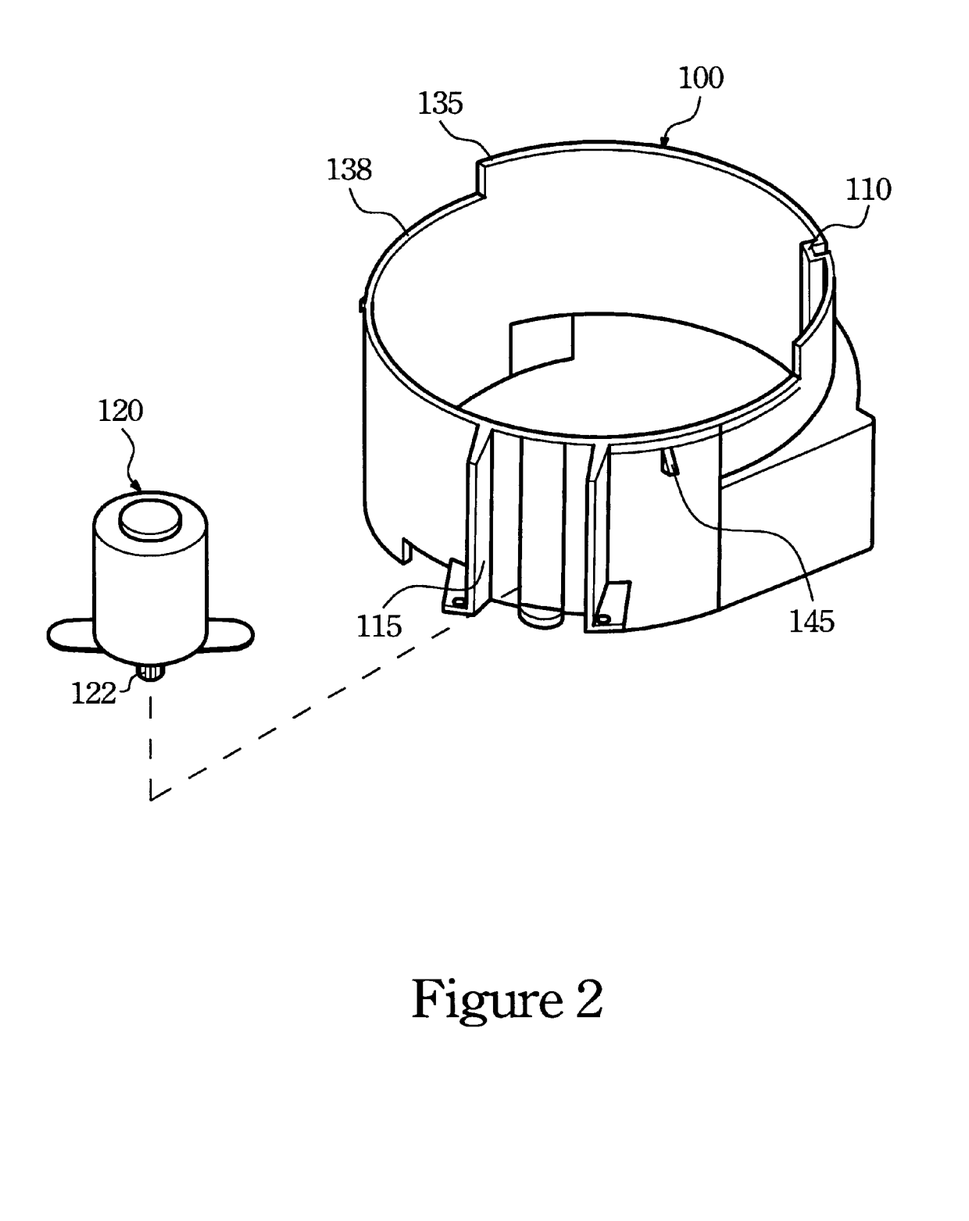
FIG. 2 shows a front view of a lens housing of the present shutter and lens apparatus.

Referring to FIG. 2, the lens housing 100 connecting with the focus adjustment 400 is designed for receiving and locating the shutter and lens assembly 200 by fitting the log key 110 with the key way 205, 295 (shown in FIG. 1). A connecting flange 115 shaped on the side wall of lens housing 100 carries driving means 120, such as motor, which is capable to raise and descend altitudes of lens 230 via gear assembly 505 and focus adjustment 400. In this preferred embodiment, the driving means 120 is a stepping motor, and a first top rim 135 of the side wall with the long key 110 is higher than a second top rim 138, however they should be regarded as optimized alternatives in stead of limits.

Figure 3A:
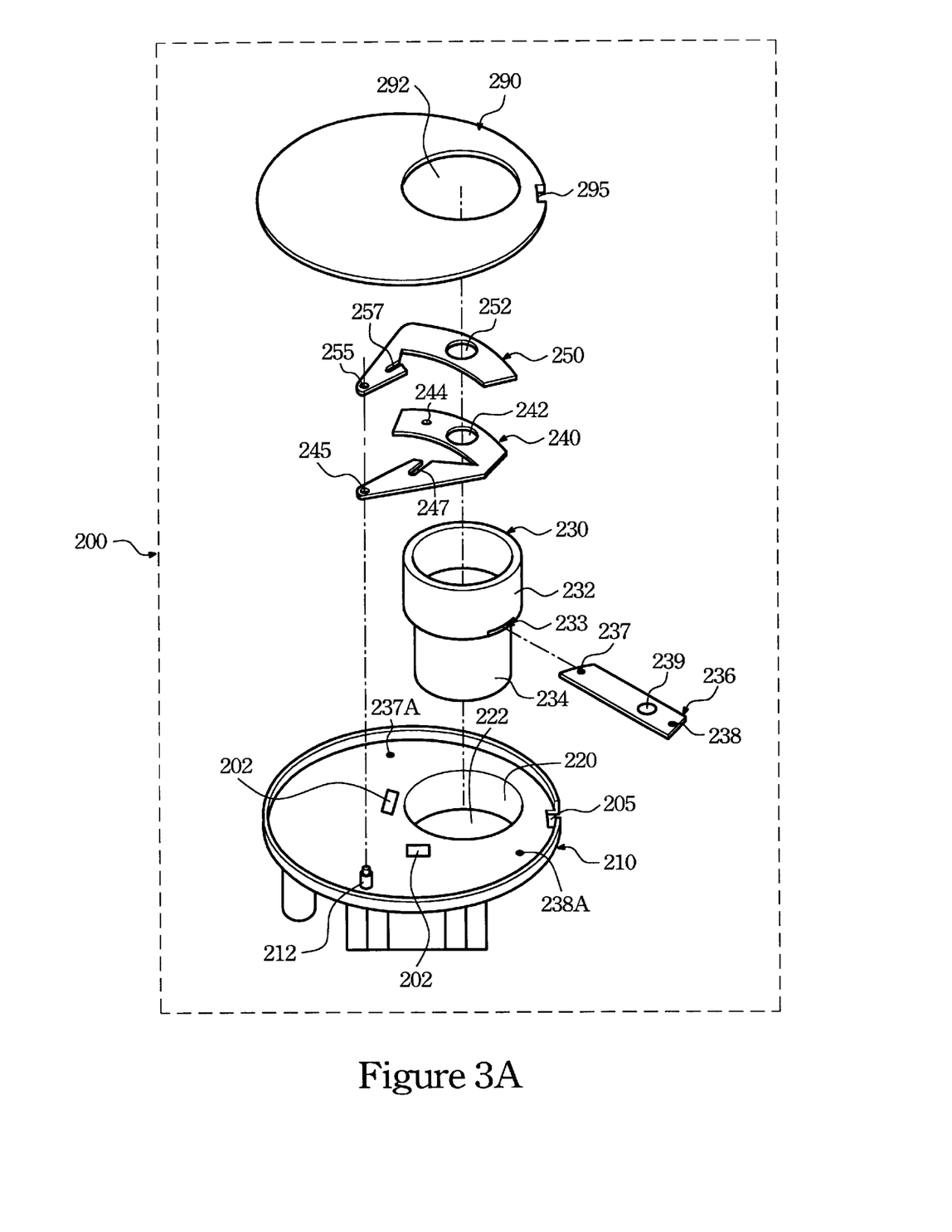
FIG. 3A shows an exploded diagram of a lens and shutter apparatus of the present shutter and lens apparatus.

Referring to FIG. 3A, it shows details of the shutter and lens assembly 200. The V-shaped diaphragm 240 has a first aperture 242 and second aperture 244 located on a flank of it. When the shutter aperture 252 of the shutter slice 250 in placed in the slot 233 and coincides with the axis of lens 230, light reflected from objects will project through the lens 230 without obstacles. Otherwise, if the aperture 252 is placed centrifugal from the axis of lens 230, the light will not project through the lens 230. Therefore the sensor chip of the shutter and lens apparatus will not generate any photo charges. In addition, the diaphragm 240 is capable to adjust quantities of the projected light by selectively swinging the first aperture 242 or the second aperture 244 across the slot 233 through the axis of the light. Furthermore, the shutter slice 250 and diaphragm 240 are pivoted on the multi-function support 210 by fitting the hole 255 of shutter slice 250 and hole 245 of diaphragm 240 with the shaft 212. The lens 230 is placed in a lens seat 222 of multi-function support 210 and fixed by a split 236, which sticks into the slot 233 and is mounted on pillars 237A, 238A by its two ends 237, 238. Thereafter, the multi-function support 210 is covered by the support cover 290 with an opening 292 for allowing the lens 230 extruding from it.

Figure 3B:
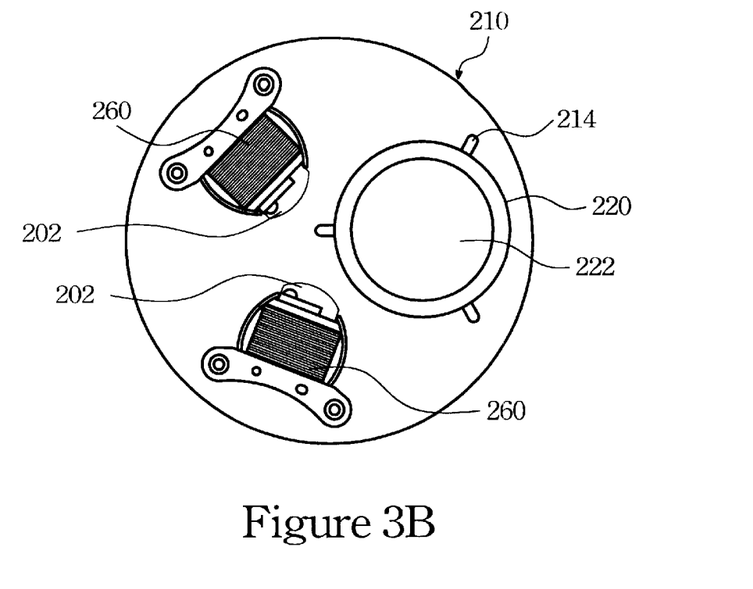
FIG. 3B shows a bottom view of a multi-function support of the present shutter and lens apparatus.
Figure 3C:
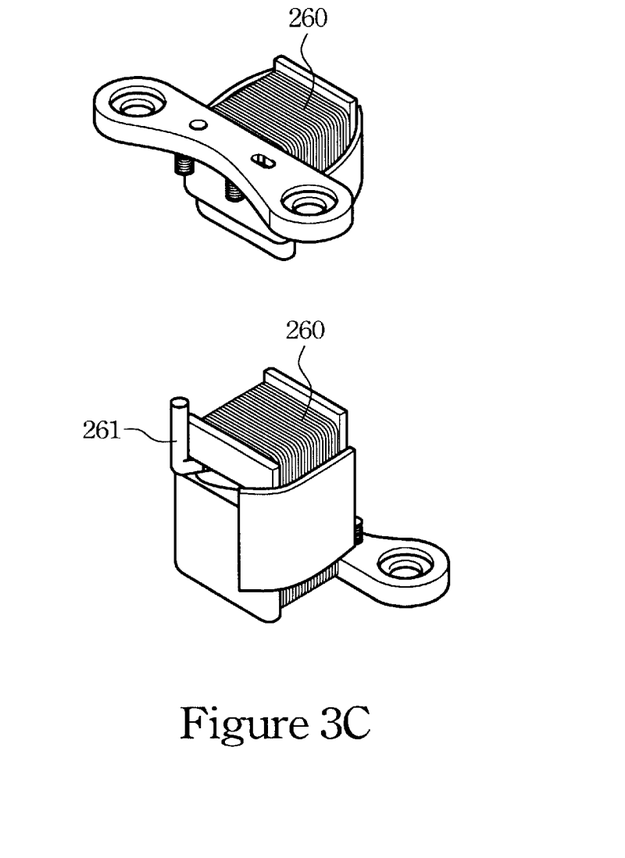
FIG. 3C shows side views of a solenoid valve of the present shutter and lens apparatus.
Figure 3D:
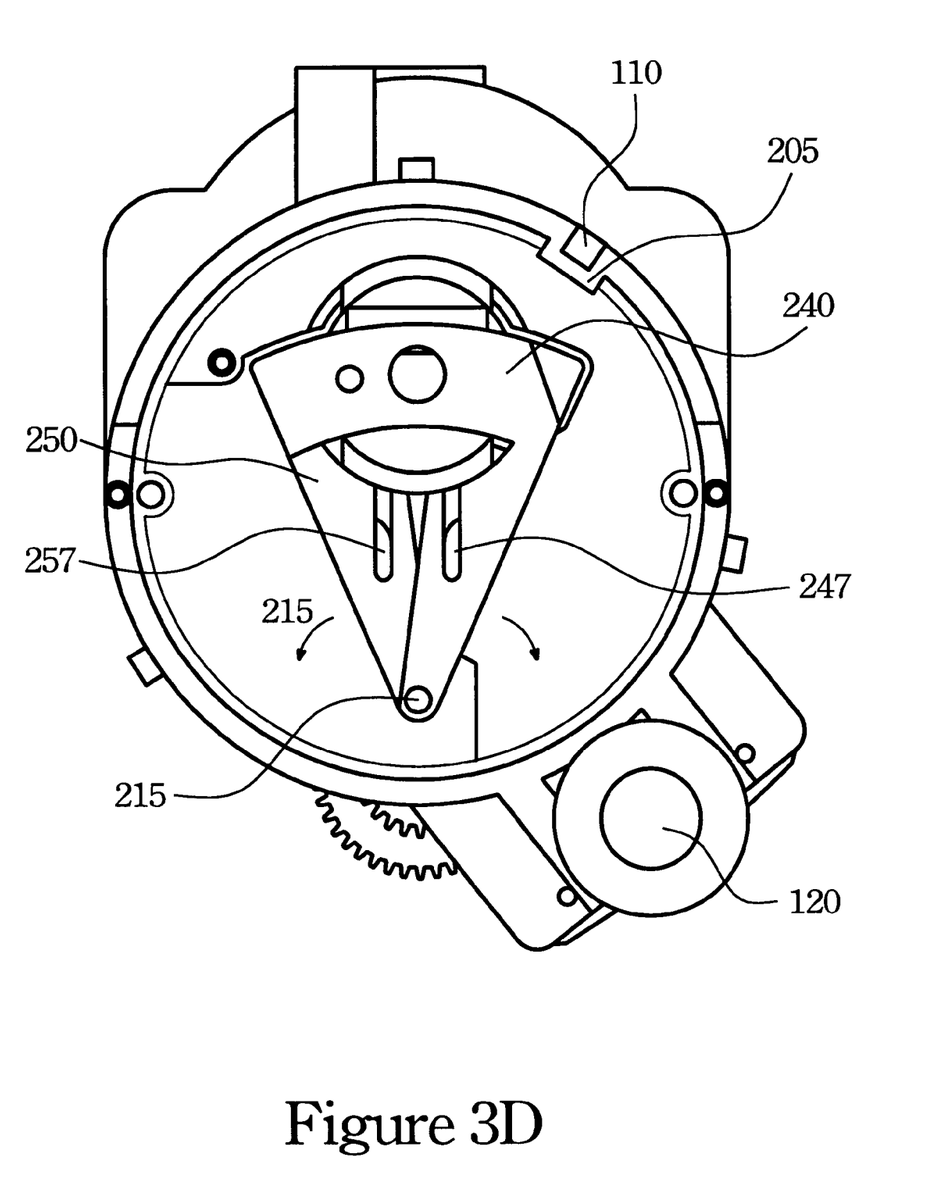
FIG. 3D shows a top view of the multi-function support with shutter slice and diaphragm thereon of the present shutter and lens apparatus.

FIG. 3B shows a bottom view of the multi-function support 210. The multi-function support has the lens seat 222, three extrusions 214, and two solenoid valves 260. Referring to FIG. 3C and FIG. 3D, the solenoid valves 260 have rods 261, which extrudes through two openings 202 and are clipped in grooves 247, 257 (see FIG. 3A). When electricity flows through the solenoid valves 260, the rods 261 would be driven forward and backward, thereby swinging the shutter slice 250 and the diaphragm 240 along the direction of arrows 215. Therefore, the shutter slice 250 and diaphragm 240 will be moved form their original positions, in which the apertures of shutter slice and diaphragm coincides with the axis of lens, to control a specific quantity of light to project through the lens 230. In this preferred embodiment, the shutter slice 250 and diaphragm 240 are driven by the solenoid valves 260, however the diaphragm 240 could also be driven by the driving means 120, due to that the diaphragm may not need as fast as the moving speed of the shutter slice 250.

Figure 4A:
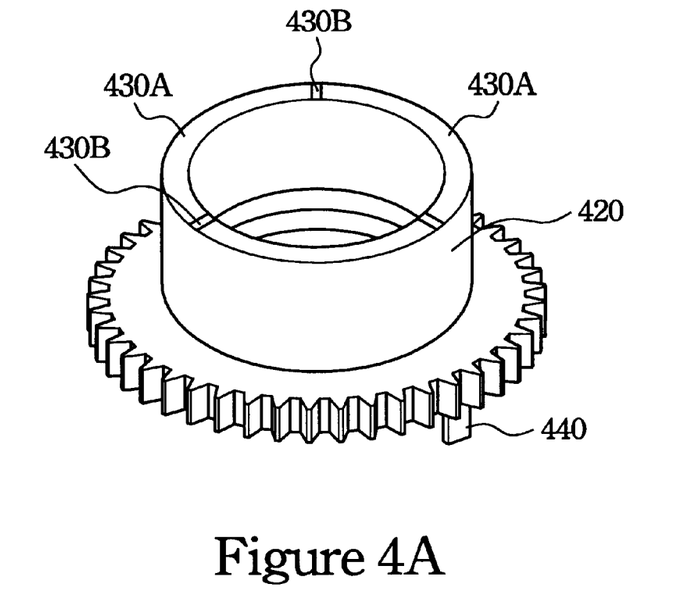
FIG. 4A shows a three-dimensional view of a focus adjustment of the present shutter and lens apparatus.

FIG. 4A shows a three-dimensional view of the focus adjustment 400 including a focus gear 410 and lens tube 420. The lens tube 420 is fitted with a side wall 220 of lens seat 222 (see FIG. 3B) and contacts to the extrusions 214 (also see FIG. 3B) with its top surface. The top surface of the lens tube 420 has several inclines, on which extrusions 214 rest, for changing altitudes of the lens 230 mounted on the multi-function support 210 by moving the extrusions 214 thereon. When the driving means 120 turns the focus adjustment 410 via the gear assembly 505 (see FIG. 5), the extrusions 214 of multi-function support 210 will move on the inclines 430A thereby changing the altitudes of the lens 230. Since the inclines 430A are continuous planes, the focus of lens 230 could be adjusted in a stepless state. In this preferred embodiment, the top surface of the lens tube 420 are divided by three main inclines 430A jointed by three sharp inclines 430B, whose arc lengths are much shorter than those of the main inclines 430A. Each main incline 430A has the same slope, length, and altitudes of its apex and lowest points with others. The distance between the apex and lowest point of the inclines 430A is preferably from about 0.1~0.6 mm, and typically from about 0.2~0.4 mm.

Figure 4B:
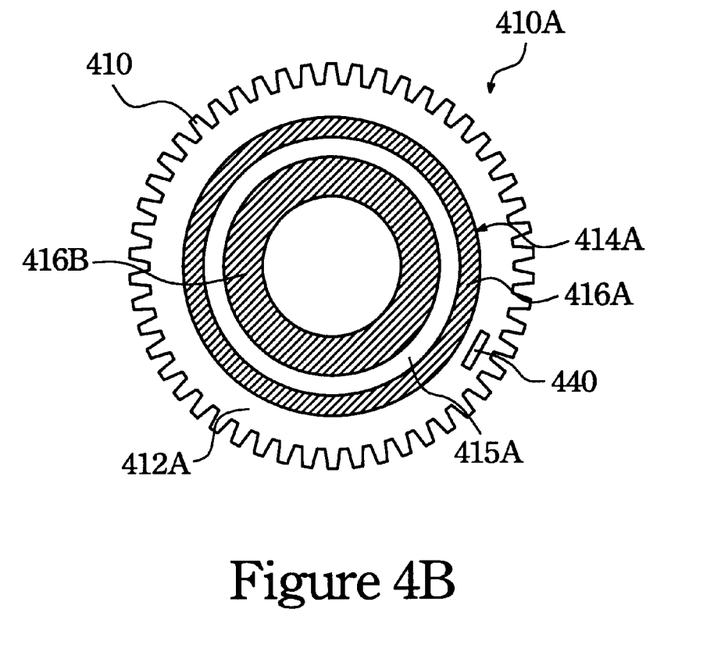
FIG. 4B shows a bottom view of the focus adjustment of the present shutter and lens apparatus.

An initial mark 440 is projected on the focus adjustment 410 for initializing the extrusions 214 being rested on the lowest point of the inclines 430A. Thus, the lens 230 would rest on the lowest point and move upwardly during the period of adjusting focus. However, it would also be proper to set the initial mark 440 at another place to initialize the lens 230 in a different altitude. Referring to FIG. 4B, the bottom 410A of the focus adjustment 410 has annular grooves 416A and 416B, which are divided by a rim 415A, and the focus adjustment 410 are connected with gear assembly 505 by fitting the annular groove 416A with a protruding rim 545 (see FIG. 5).

Figure 5:
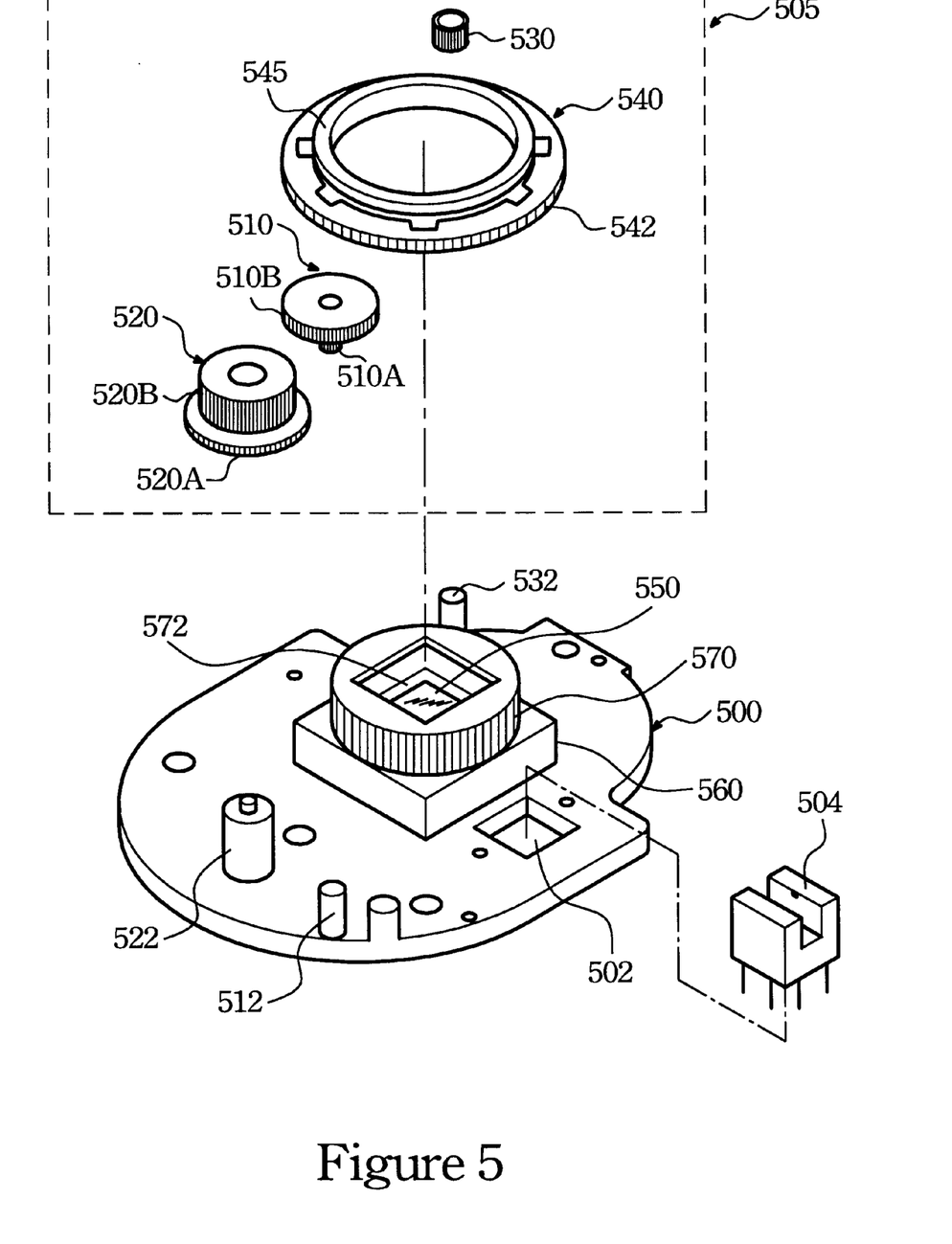
FIG. 5 shows an exploded view of a CCD base and a gear assembly of the present shutter and lens apparatus.

FIG. 5 shows a sensor chip base 500, micro adjustment 540, and gear assembly 505. The gear assembly 505 includes a first decelerating gear 510, a second decelerating gear 520, and lens adjusting gear 530. A square base 560 is placed on the top surface of the sensor chip base 500 for receiving the sensor chip 550. A tube 570 with a square opening 572, which allows light projecting onto the sensor chip 550, is embedded on the square base 560 and screws into the inner wall of the micro adjustment 540.

Teeth 542 of the outer rim of micro adjustment 540 couples with the lens adjusting gear 530. Because digital cameras are sensitive machines, even several micrometers of deviation would out focus the sensor chip. Turning the lens adjusting gear 530 to drive the micro adjustment 540, the lens 230 coupled with it is slightly tuned upwardly or downwardly to reach a precise position, upon which the lens 230 could be adjusted in an effective focus region by turning the focus adjustment 400. Typically, the tuning is performed in the manufacturing processes, and after the tuning, the relative positions of the lens adjusting gear 530 and micro adjustment 540 are then rigidly fixed so as to prevent users from changing the positions. It's noticed that for tuning the lens 230 slightly and precisely, the teeth 542 of micro adjustment 540 are much more than the teeth of the lens adjusting gear 530.

Still referring to FIG. 5, a plurality of pillars are mounted on the top surface of sensor chip base 500, for instance, a pillar 512 connecting with the first decelerating gear 510, pillar 522 connecting with the second decelerating gear 520, and pillar 532 connecting with the lens adjusting gear 530. The first decelerating gear 510 is consisted of an upper gear 510B and a lower gear 510A. The upper gear 510B, which is connected with the gear 122 of stepping motor 120 (see FIG. 2) has more teeth and a lager radius than the lower gear 510A does. The second decelerating gear 520 is consisted of an upper gear 520B and a lower gear 520A. The upper gear 520B, which is connected with the focus adjustment 410 (see FIG. 4B), has a smaller radius than the lower gear 520A does. The lower gear 520A having the largest radius and most teeth among gears 510A, 510B, 520A, and 520B is coupled with the lower gear 510A of first decelerating gear 510. It is noticed that the radii and numbers of teeth of the gears 510A, 510B, 520A, and 520B could be optimized according desired decelerating ratios and angular speeds of motor 120. In addition, a position detector 504 is placed in a square opening 502 and fixed pins projected from its bottom on a printed circuit board 620 (see FIG. 6), which 620 is fixed on the bottom of sensor chip base 500 thereby locating the position detector 504. The position detector 504 would output a signal to display that whether the position mark 440 is already on its initial point.

Figure 6:
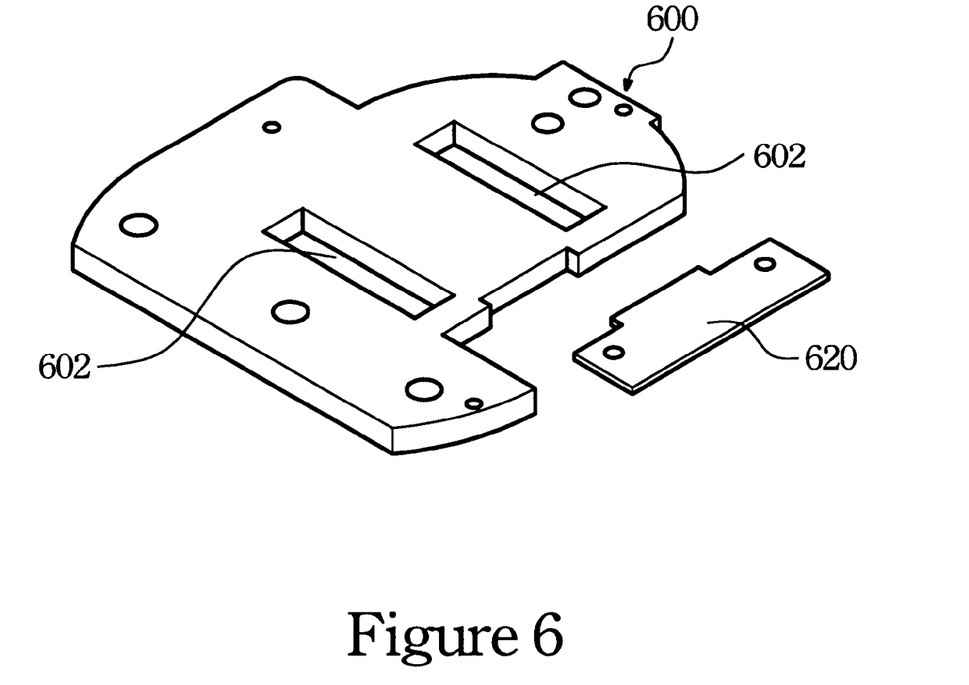
FIG. 6 shows a three-dimensional view of an aluminum board of the present shutter and lens apparatus.

Referring to FIG. 6, the aluminum plate 600 attached on the bottom of sensor chip base 500 has two slots 602 allowing the pins of the sensor chip 550 to stretch out of it. In addition, the printed circuit board 620 attached on the bottom of sensor chip base 500 is connected to the position detector 504.

For understanding the present invention clearly, the operation and function of the shutter and lens apparatus are illustrated as follows in conjunction. When a shutter button is pressed, the solenoid valves turn on the shutter—locate the aperture of shutter on the axis of light projecting onto the sensor chip, simultaneously. Thereafter, a sensor detects the intensity of the projected light to drive the diaphragm to allow a proper quantity of light to enter. Then the stepping motor drives the first decelerating gear and second decelerating gear to locate the lens on focus. After the lens focused, the sensor chip captures the projected light, and then the lens sets back to its original position.

In conclusion, the present invention provides the benefits as below.

1. The light leakage due to the insensitive shutter apparatus would be suppressed.
2. Since the light leakage has been resolved, the quality of the captured image would be improved.
3. Because the frequency of the solenoid valves remains constant, it is benefited to the sensor chip with more pixels.
4. Besides the shutter and lens apparatus, the present invention also discloses the stepless focusing function and other supporting mechanisms.

As is understood by a person skilled in the art, the foregoing preferred embodiments of the present invention that are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A shutter and lens apparatus, which comprises:
   a lens housing having a cavity;
   a multi-function support placed in the cavity, having a lens seat and a plurality of extrusions around the cavity in a bottom surface of the multi-function support;
   a lens positioned in the lens seat;
   a shutter slice having a shutter aperture, and pivoting on a shaft of the multi-function support for allowing the shutter aperture passing light through the lens by pivoting to the shaft;
   a diaphragm having a first ape and a second aperture, and pivoting on the shaft for allowing the first aperture or the second aperture to pass the light path;
   a first solenoid valve attached on a bottom of the multi-function support for controlling the shutter slice pivoting to the shaft;
   a second solenoid valve attached on the bottom of the multi-function support for controlling the diaphragm pivoting to the shaft;

focus adjustment having a focus adjusting gear with a plurality of inclines, the extrusions resting on and moving along the inclines thereby changing altitudes of the multi-function support;

a sensor chip base;

a sensor chip coupling with the sensor chip base for transforming light passing through the lens into electric output signals;

a spring mounted on the multi-function base; and a housing cover encasing the spring, the lens, and the multi-function support in the lens housing, the spring stressed between the housing cover and the multi-function support keeping the extrusions contacting with the inclines while focusing the lens.

2. The shutter and lens apparatus of claim 1, further comprising a split for dividing the shutter slice and the diaphragm.

3. The shutter and lens apparatus of claim 1, wherein the first solenoid valve has a movable rod for turning the shutter slice.

4. The shutter and lens apparatus of claim 1, wherein the second solenoid valve has a movable rod for turning the diaphragm.

5. The shutter and lens apparatus of claim 1, wherein the lens comprises a slot for allowing the shutter slice or the diaphragm placing into the slot, thereby enabling the light passing through the lens.

6. A shutter and lens apparatus, which comprises:

a lens housing having a cavity;

a multi-function support, which is placed in the cavity, having a lens seat, and a plurality of extrusions around the cavity in a bottom surface of the multi-function support;

a lens positioned in the lens seat;

a shutter slice having a shutter aperture, and pivoting on a shaft of the multi-function support for allowing the shutter aperture passing light through the lens by pivoting to the shaft;

a diaphragm having a first aperture and a second aperture, and pivoting on the shaft for allowing the first aperture or the second aperture to pass the axis;

a first solenoid valve attached on a bottom of the multi-function support for controlling the shutter slice pivoting to the shaft;

a second solenoid valve attached on the bottom of the multi-function support for controlling the diaphragm pivoting to the shaft;

a focus adjustment having a focus adjusting gear with a plurality inclines, the extrusions resting on and moving along the inclines thereby changing altitudes of the multi-function support and the lens;

a first decelerating gear driven by driving means outside the shutter and lens apparatus;

a second decelerating gear driven by the first decelerating gear and connecting with the focus adjusting gear to tune the focus adjustment;

a micro adjustment connecting with the focus adjustment for predetermining an altitude of the focus adjustment thereby allowing the lens being adjusted in a focus range;

a sensor chip base having a plurality of pillars connected with the first decelerating gear, the second decelerating gear, and the micro adjustment;

a sensor chip coupling with the sensor chip base for transforming the light passing through the lens into electric output signals;

a spring mounted on the multi-function base; and a housing cover encasing the spring, the lens, and the multi-function support in the lens housing, the spring stressed between the housing cover and the multi-function support keeping the extrusions contacting with the inclines while focusing the lens.

7. The shutter and lens apparatus of claim 6, further comprising a split for dividing the shutter slice and the diaphragm.

8. The shutter and lens apparatus of claim 6, wherein the first solenoid valve has a movable rod for turning the shutter slice.

9. The shutter and lens apparatus of claim 6, wherein the second solenoid valve has a movable rod for turning the diaphragm.

10. The shutter and lens apparatus of claim 6, wherein the driving means comprises a stepping motor.

11. The shutter and lens apparatus of claim 6, further comprising:

an initial mark on a bottom surface of the focus adjustment; and a position detector sensing the initial mark to locate the focus adjustment.

12. The shutter and lens apparatus of claim 6, wherein the first decelerating gear comprises a first gear and second gear, in which the first gear is larger than the second gear in radius, and the first gear connects to the driving means, and the second gear connects to the second decelerating gear.

13. The shutter and lens apparatus of claim 6, wherein the second decelerating gear comprises a first gear and second gear, in which the first gear is larger than the second gear in radius, and the first gear connects to the first decelerating gear, and the second gear connects to the focus adjustment.

14. The shutter and lens apparatus of claim 6, wherein the lens comprises a slot for allowing the shutter slice or the diaphragm placing into the slot, thereby controlling an amount of the light passing through the lens.

15. The shutter and lens apparatus of claim 6, wherein the inclines comprises main inclines and sub-inclines, in which the main inclines are in a same altitudes and divided by the sub-inclines, for allowing the extrusions moving along the inclines thereby changing altitudes of the lens.

* * * * *